Patented June 23, 1953

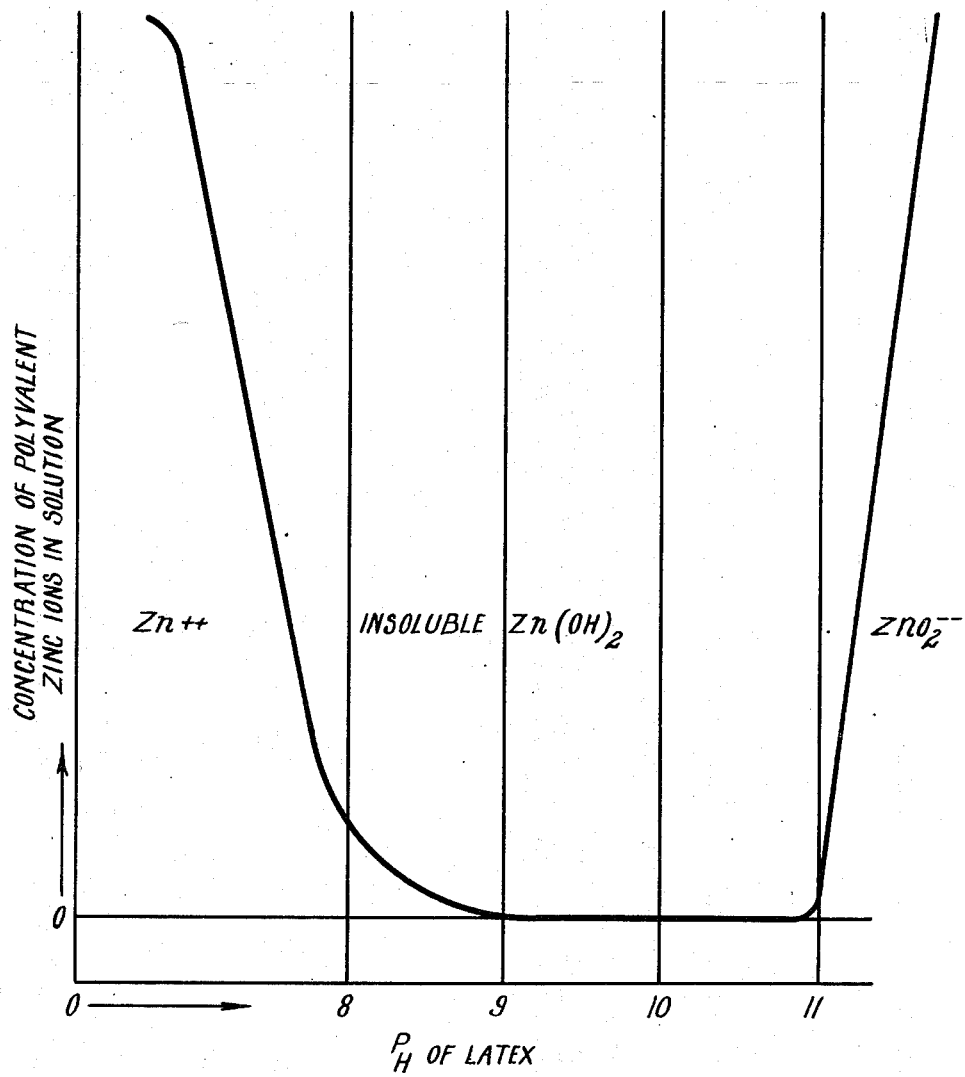

2,643,233

UNITED STATES PATENT OFFICE 2,643,233

METHOD OF MAKING LATEX FOAM

Bailey Bennett and George H. McFadden, Columbus, Ohio, assignors, by mesne assignments, to General Motors Corporation, Detroit, Mich., a corporation of Delaware Application April 28, 1950, Serial No. 158,720

7 Claims. (Cl. 260—2.5)

This invention relates to latex foam and is particularly concerned with methods for compounding said foam in addition to control procedures to facilitate said compounding.

It is, therefore, the basic object of the invention to provide a method for compounding foamed latex wherein control of the pH of the latex simultaneously facilitates compounding and subsequent gelation thereof. In carrying out this object, it is a further object to adjust the pH of latex, prior to compounding, to within the range of 8 to 9.8, which range has been determined as the most satisfactory gelation range. Similarly, the pH range of the latex noted is one within which polyvalent zinc ions are insoluble whereby complete compounding of the latex including the zinc oxide may be carried out prior to or during foaming thereof.

A still further object of the invention is to control the pH of the latex so that polyvalent zinc ions are insoluble therein whereby zinc oxide may be added in the compounding of the latex at any time during the foaming thereof.

Further objects and advantages of the present invention will be apparent from the following description, reference being had to the accompanying chart which shows the concentration of polyvalent zinc ions in solution plotted against the pH of latex.

Sponge rubber may be made from foamed latex. This foamed latex is compounded prior to or during the foaming and includes a gelling agent which, after the latex is foamed, will gel the same within a mold in a predetermined and desired period of time after the mold is filled. The mold with the gelled latex therein is next heated to cure the latex compound and provide a molded spongy rubber-like article.

We have found that the difficulties heretofore encountered in the compounding of latex and foamed sponge rubber revolve around the fact that polyvalent zinc ions are soluble in latex within broad ranges of pH and this problem has always confronted the industry. Heretofore in the compounding of latex foams, it is common practice to add all the compounding ingredients to the latex either prior to or during foaming thereof with the exception of the zinc oxide and the delayed coagulant. Zinc oxide is usually added after foaming is substantially completed and in most cases the zinc oxide is added with the gelling agent just prior to pouring the foam into a mold. This procedure has been carried out because zinc oxide is effectively soluble in latex under certain pH conditions, said conditions being prevalent in all the commercial foaming procedures known to us excepting polychloroprene operations. The addition of the zinc oxide at the end of the foaming period is undesirable for several reasons, first, it is difficult to get a satisfactory dispersion of the zinc oxide throughout the latex after the latex has been foamed: the addition is made last due to solubility which is still a problem and therefore some of the zinc oxide is lost in the foam requiring compensating additions to bring the zinc oxide percentage to the desired figure; the addition of the zinc oxide separate from the other compounding ingredients increases the cost of manufacture since it is an added operation.

These and other factors make the addition of zinc oxide together with all other compounding ingredients except the delayed coagulant or gelling agent highly desirable if a satisfactory means can be devised for such addition.

We have found that solubility of polyvalent zinc ions in latex is a function of the pH of the latex. Referring to the chart, it will be seen that the concentration of polyvalent zinc ions in solution in the latex, in this case, a mixture of 350 parts natural latex and 150 parts of butadienestyrene copolymer latex, is practically nil within the pH range of 8 to 11. When the pH drops below 8, the concentration rises rapidly whereas when the pH passes 11, the solubility curve of the zincate ion is almost a perpendicular line. The area within the curve, on the other hand, embraces insoluble zinc hydroxide. It is apparent from this chart, therefore, that if the pH of the latex is maintained between 8 and 11 that the solubility of polyvalent zinc ions is practically nil. In this connection, figures for the chart are derived from a polarographic study of the behavior of zinc and this same condition prevails in all aqueous systems, hence in any type or combination of types of latices.

On the other hand, we have found that gelation of foamed latex is best carried out within a closely controlled pH range, said range being between 8 and 9.8 with a figure of 9.6 being preferred for normal room temperature for example 68° F.

Evaluating the figures disclosed herein, it will be readily noted that if the pH range of the latex is adjusted to a point between 8 and 9.8, zinc oxide may be added at any desired time and with all other compounding ingredients except the gelling agent without the formation of any polyvalent zinc ions and likewise the latex will be within the desired pH range for proper gelation.

Adjustment of pH in latex may be accomplished in several ways. In natural rubber latex, the pH may be changed by merely stirring the latex to drive off ammonia. In other types of latex, additions of water soluble amino acids, phenols, amides and imides may be used for the controlled reduction of pH without coagulation. Such substances as glycine (amino acetic acid), have been used with success. However, these methods of controlling pH require addition of substances to the latex and if the pH may be adjusted without such additions, it is obvious that such type of adjustment is the most desirable.

In butadiene-styrene copolymer latex and other synthetic types of latices, the pH of commercial grades thereof is generally fairly high. This is due to the fact that a butadiene-styrene copolymer is usually creamed, reacted during copolymerization or otherwise concentrated to obtain the solids content desired, which normally ranges from 53 to 65% wherein high pH generally exists. In this high pH type of latex, which is a commercial grade, it is therefore always necessary to reduce the pH in order to get within the desired range mentioned herein. In butadiene-styrene copolymer latex of low solids content, for example, 40 to 50% solids, it is comparatively easy to control the pH to a relatively low figure, for example, about 7. This latex however is too low in solids to foam readily and therefore, cannot be used per se in commercial operations. We have found that the best method for controlling the pH of latices is, therefore, to mix standard latices of high solids content which have the attendant high pH with latices of low solids content which have a low pH whereby the adjustment of the pH range may be readily accomplished without the addition of any extraneous materials. For example, 58% solids butadiene-styrene copolymer latex, having a pH of 11 may be mixed with butadiene-styrene copolymer latex of 46% solids having a pH of 7 in the ratio of 3½ to 2 whereby the final latex has a solids content of 53.6% and a pH of 9. In general, a latex which has a solids content of less than 50% should have a pH below 8.5 while the latex which has a solids content above 50% should have a pH above 10. Mixtures of these two latices should then be made in proportions so as to yield a solids content of at least 50% with a pH within the range of 8 to 9.8. Obviously this method of adjusting pH is considerably more satisfactory than by adding various chemicals to change the pH which, in some cases, will cause local coagulation or other undesirable effects and similarly the method disclosed herein is considerably cheaper since latices of varying solids content may be obtained and the adjustment of pH is therefore a simple matter. It is to be understood that any latex may be operated upon by the methods disclosed herein, for example, latices of natural rubber, butadiene-styrene copolymers, butadiene-acrylonitrile copolymers, polychloroprene, aqueous dispersions of reclaimed rubber, coagulated latex or vulcanized rubber, etc., or any other satisfactory latex or aqueous rubber-like dispersion or mixture thereof may be regulated in this manner. Other synthetic rubber latices may be used and these may be any latex selected from the class prepared by the polymerization in aqueous emulsion of a butadiene-1,3 hydrocarbon such as butadiene-1,3, isoprene, 2,3-dimethyl butadiene-1,3, piperylene or the like either alone or in admixture with each other and/or in admixture with lesser or equal amounts of one or more monoethylenic compounds copolymerizable therewith in aqueous emulsion such as acrylonitrile, methacrylonitrile, alpha-chloro acrylonitrile and similar acrylic nitriles; styrene, vinyl naphthalene, p-chlorostyrene and similar aryl olefins and substituted aryl olefins; methyl acrylate, methyl methacrylate, acrylamide and similar esters and amides of acrylic acids; methyl isopropenyl ketone, vinylidene chloride, isobutylene, methyl vinyl ether, and other compounds containing a single ethylenic double bond, $>C=C<$, which are copolymerizable with butadiene-1,3 hydrocarbons in aqueous emulsion. In fact, any of the compounds which may be termed butalastics as defined in the book "Butalastic Polymers, a Treatise on Synthetic Rubbers" by Marchionna may be used with success. Specific foaming techniques are not set forth here since these techniques are well known in the art. Gelling agents, such as sodium fluosilicate, potassium or sodium fluotitanate or the alkali salts of fluozirconic acid may all be used, for example, as shown in McFadden Patent No. 2,472,054 and McFadden, et al., Patent No. 2,472,055. Similarly, ingredients, other than compounding ingredients, may be added to the latex foam such as glass fiber as disclosed in Bennett et al. Patent No. 2,498,785.

The specific compounding ingredients do not form a part of this invention with the exception that the invention is basically directed to a method for permitting addition of zinc oxide with the other compounding ingredients except the gelling agent. A few of the examples of compounds which make satisfactory sponges, wherein all the compounding ingredients are added prior to or after beating commences are as follows:

Example #1

|  | G. | Solids, percent | pH |
|---|---|---|---|
| Lotol 5010-C | 350 | 58 | 11 |
| Latex H-316 | 200 | 46 | 7 |
| Master M-FLB-32 | 60 |  |  |
| Sodium fluosilicate, 40% | 25 |  |  | pH of mixed latices _____ 9
Gel time _____ 14.5 min.
Temperature _____ 73° F.
Cure time _____ 20 minutes at 10 p. s. i.

Example #2

|  | G. | Solids, percent | pH |
|---|---|---|---|
| Lotol 5010-C | 350 | 58 | 11 |
| Latex H-316 | 200 | 46 | 7 |
| Zinc oxide slurry | 32.5 |  |  |
| Sodium fluosilicate, 40% | 25 |  |  | pH of mixed latices _____ 9
Gel time _____ 11 min.
Temperature _____ 81° F.
Cure time _____ 20 minutes at 10 p. s. i.

Example #3

|  | G. | Solids, percent | pH |
|---|---|---|---|
| Anode natural | 350 | 63 | 9 |
| Latex H-417 | 150 | 42 | 7 |
| Master M-FLB-32 | 60 |  |  |
| Sodium fluosilicate, 40% | 20 |  |  | pH of mixed latices _____ 8.5
Gel time _____ 7 min.
Temperature _____ 73° F.
Cure time _____ 20 minutes at 10 p. s. i

Example #4

|  | G. | Solids, percent | pH |
|---|---|---|---|
| Anode natural | 350 | 63 | 9 |
| Latex H-417 | 150 | 42 | 7 |
| Master M-FLB-32 | 60 | | |
| Sodium fluotitanate, 40% | 20 | | | pH of mixed latices _____ 8.5
Gel time _____ 8 min.
Temperature _____ 73° F.
Cure time _____ 20 minutes at 10 p. s. i.

Example #5

|  | G. | Solids, percent | pH |
|---|---|---|---|
| Anode natural | 350 | 63 | 9 |
| Latex H-316 | 150 | 42 | 7 |
| Master M-FLB-32 | 60 | | |
| Sodium fluosilicate, 40% | 20 | | | pH of mixed latices _____ 8
Gel time _____ 4.5 min.
Temperature _____ 77° F.
Cure time _____ 20 minutes at 10 p. s. i.

Example #6

|  | G. | Solids, percent | pH |
|---|---|---|---|
| Anode natural** | 500 | 63 | 8 |
| Water | 35 | | |
| Neutralized K castor oil soap, 35% | 10 | | |
| Zinc oxide slurry | 32.5 | | |
| Sodium fluosilicate, 40% | 25 | | |

Gel time _____ 4 min.
Temperature _____ 74° F.
Cure time _____ 20 minutes at 10 p. s. i.

Example #7

|  | G. | Solids, percent | pH |
|---|---|---|---|
| Anode natural** | 500 | 63 | 8 |
| Potassium oleate, 21% | 17.5 | | |
| Water | 40 | | |
| Master M-FLB-32 | 60 | | |
| Sodium fluotitanate, 40% | 20 | | |

Gel time _____ 6 min.
Temperature _____ 73° F.
Cure time _____ 20 minutes at 10 p. s. i.

Example #8

|  | Solids, percent | pH |
|---|---|---|
| Natural Latex (60%) | 350 | 9 |
| Butadiene-acrylonitrile (35%) | 150 | 7 |
| Petrolatum Emulsion (50%) | 10 | |
| Casein Solution (10%) | 18 | |
| Master Batch M-FLB-32 | 60 | |
| Sodium Fluosilicate Suspension (40%) | 20 | | pH of mixed latices _____ 8.5
Gel time _____ 5 minutes
Cure time _____ 20 minutes at 10 p. s. i.

Example #9

Natural Latex (60%) _____ 350% solids
Butaprene (30%) _____ 150% solids
Petrolatum emulsion (50%) _____ 10% solids
Casein solution (10%) _____ 18% solids
Master batch M-FLB-32 _____ 60% solids
Sodium fluosilicate suspension (40%) _____ 25% solids
pH of mixed latices _____ 9.8
Gel time _____ 6 minutes
Cure time _____ 20 minutes at 10 p. s. i.

Example #10

|  | Solids, percent | pH |
|---|---|---|
| Polychloroprene (60% solids) | 350 | 10.5 |
| Butadiene-Styrene Copolymer (46% solids) | 200 | 7.0 |
| Master Batch (M-FLB-32 | 60 | |
| Sodium Fluosilicate (40%) | 25 | | pH of mixed latices _____ 9.0
Gel time _____ 13 minutes
Temperature _____ 72° F.
Cure time _____ 20 minutes at 10 p. s. i.

The master batch M-FLB 32 noted includes the following ingredients:

| | G. |
|---|---|
| Zinc oxide | 600 |
| Titanium oxide (water dispersable) | 120 |
| Sulfur | 300 |
| Zenite special | 150 |
| Accelerator #552 | 90 |
| Ethyl zimate | 60 |
| Agerite white | 90 |
| Casein solution 10% | 525 |
| Darvan #1 solution 10% | 358 |

Ball-milled twenty-four hours.

The latices mentioned in the foregoing examples are given under trade names and type numbers. "Anode natural" is natural rubber latex. "Lotol 5010-C" and "Latex H-316 and H-417" are butadiene-styrene copolymer latices while "Butaprene" is a butadiene-acrylonitrile copolymer type of latex. In this connection other master batches may be used, or instead of a master batch, the ingredients may be added separately. However, in the usual compounding techniques, it is agreed that a master batch provides an easier means for making the addition of chemicals.

From the foregoing, it is apparent that we have set forth a new method for compounding latices wherein any combination of two compatible latices of varying solids content and different pH are mixed to obtain a latex having the desired pH of a usable solids content whereupon, due to control, the compounding ingredients except the gelling agent may all be added, including the zinc oxide, either prior to or during the foaming operation, thereby reducing manufacturing time and cost and producing a product of high quality, free from extraneous materials heretofore used to prevent dissolution of the zinc oxide.

While the embodiments of the present invention as herein disclosed, constitute preferred forms, it is to be understood that other forms might be adopted.

What is claimed is as follows:

1. In a method of making foamed latex articles, the steps comprising, admixing two compatible latices of rubbery materials, one of which has a solids content of below 50% by weight and a pH of not more than 8.5 and the other of which has a solids content of above 50% by weight and a pH of above 10 in proportions so that the resulting mixture of latices has a solids content of at least 50% by weight and a pH within the range of 8 to 9.8, adding the zinc oxide and all of the compounding ingredients to the latex except the gelling agent, foaming the latex, adding the gelling agent, and then molding said compounded latex and finally curing the molded latex.

2. In a method of making foamed latex articles, the steps comprising; admixing rubbery butadiene-styrene copolymer latex having a solids content of from 35 to 46% by weight and a pH of from 7 to 8.5 with a natural rubber latex having a solids content of from 55 to 70% by weight and a pH range of from 9.5 to 10.5, in proportions so that the resulting mixture of latices has a solids content of at least 50% by weight and a pH within a range of 8 to 9.8, adding zinc oxide and all of the other compounding ingredients to the latex except the gelling agent, foaming the latex, adding the gelling agent, molding said compounded latex, and finally curing the molded latex.

3. In a method of making foamed latex articles, the steps comprising; admixing a rubbery butadiene-styrene copolymer latex having a solids content of below 50% by weight and a pH of not more than 8.5 with another compatible latex of a rubbery material having a solids content of above 50% by weight and a pH above 10, in proportions so that the resulting mixture of latices has a solids content of at least 50% by weight and a pH within a range of 8 to 9.8, adding zinc oxide and all of the other compounding ingredients to the latex except the gelling agent, foaming the latex, adding the gelling agent, molding said compounded latex, and finally curing the molded latex.

4. The method as claimed in claim 3, wherein the second mentioned latex is rubbery butadiene-styrene copolymer latex.

5. The method as claimed in claim 3, wherein the second mentioned latex is rubbery butadiene-acrylonitrile copolymer latex.

6. The method as claimed in claim 3, wherein the second mentioned latex is polychloroprene latex.

7. A method of making foamed latex articles wherein the solubility of polyvalent zinc ions is controlled during the compounding thereof, the steps consisting of; admixing two compatible latices of rubbery materials, one of which has a solids content of below 50% by weight and a pH of not more than 8.5 and the other of which has a solids content of above 50% by weight and a pH of above 10, in proportions so that the resulting mixture of latices has a solids content of at least 50% by weight and a pH of 9.6, adding zinc oxide and all of the other compounding ingredients to the pH adjusted latex with the exception of the gelling agent, foaming the latex, adding the gelling agent and then molding and curing the foamed latex.

BAILEY BENNETT.
GEORGE H. McFADDEN.

References Cited in the file of this patent

UNITED STATES PATENTS

| Number | Name | Date |
|---|---|---|
| 2,472,055 | McFadden et al. | May 31, 1949 |
| 2,484,434 | Van Buskirk et al. | Oct. 11, 1949 |

FOREIGN PATENTS

| Number | Country | Date |
|---|---|---|
| 588,503 | Great Britain | May 27, 1947 |

OTHER REFERENCES

Rubber Order R-1, as amended Sept. 9, 1947, Dept. of Commerce, Office of Materials Distribution, code G. P. O., Com. 146, p. 1.